United States Patent [19]

Leloux

[11] 4,089,729
[45] May 16, 1978

[54] APPARATUS FOR MANUFACTURING PLASTIC BAGS IN A CONTINUOUS WAY

[75] Inventor: Arnoldus Willem Jan Leloux, Dedemsvaart, Netherlands

[73] Assignee: Wavin B.V., Netherlands

[21] Appl. No.: 776,795

[22] Filed: Mar. 11, 1977

Related U.S. Application Data

[60] Division of Ser. No. 640,133, Dec. 12, 1975, Pat. No. 4,030,956, which is a continuation-in-part of Ser. No. 337,493, Mar. 2, 1973, abandoned.

[30] Foreign Application Priority Data

Mar. 15, 1972 Netherlands .................... 7203390

[51] Int. Cl.² .................... B32B 31/00; B31F 5/00
[52] U.S. Cl. .................... 156/498; 156/499; 156/555
[58] Field of Search .................... 156/498–499, 156/290, 580.3, 555

[56] References Cited

U.S. PATENT DOCUMENTS

| | | | |
|---|---|---|---|
| 2,952,299 | 9/1960 | Finke | 156/510 |
| 2,971,874 | 2/1961 | Canno | 156/252 |
| 2,975,824 | 3/1961 | Schenkengel | 156/499 |
| 3,153,607 | 10/1964 | Ambler | 156/582 |
| 3,388,019 | 6/1968 | Thigpen | 156/282 |
| 3,499,817 | 3/1970 | Hauens et al. | 156/306 |
| 3,622,421 | 11/1971 | Cook | 156/290 |
| 3,708,377 | 1/1973 | Finke et al. | 156/582 |
| 3,893,884 | 7/1975 | Class | 156/510 |

Primary Examiner—Douglas J. Drummond
Attorney, Agent, or Firm—Alan H. Levine

[57] ABSTRACT

Plastic bags are obtained from a tubular foil of thermoplastics by means of heatsealing. The heatsealing member acts upon a lower wall of the flattened non-tensioned tubular foil, and without a counter pressure to the upper wall of the foil. The entire thickness of the lower wall is plasticized but only a portion of the thickness of the upper wall is plasticized. The assembly of heated lower wall and partly heated upper wall facing each other is passed through two pressure rolls, the roller surface contacting the surface which has not been in contact with the heat sealing member consisting of metal is cooled.

8 Claims, 2 Drawing Figures

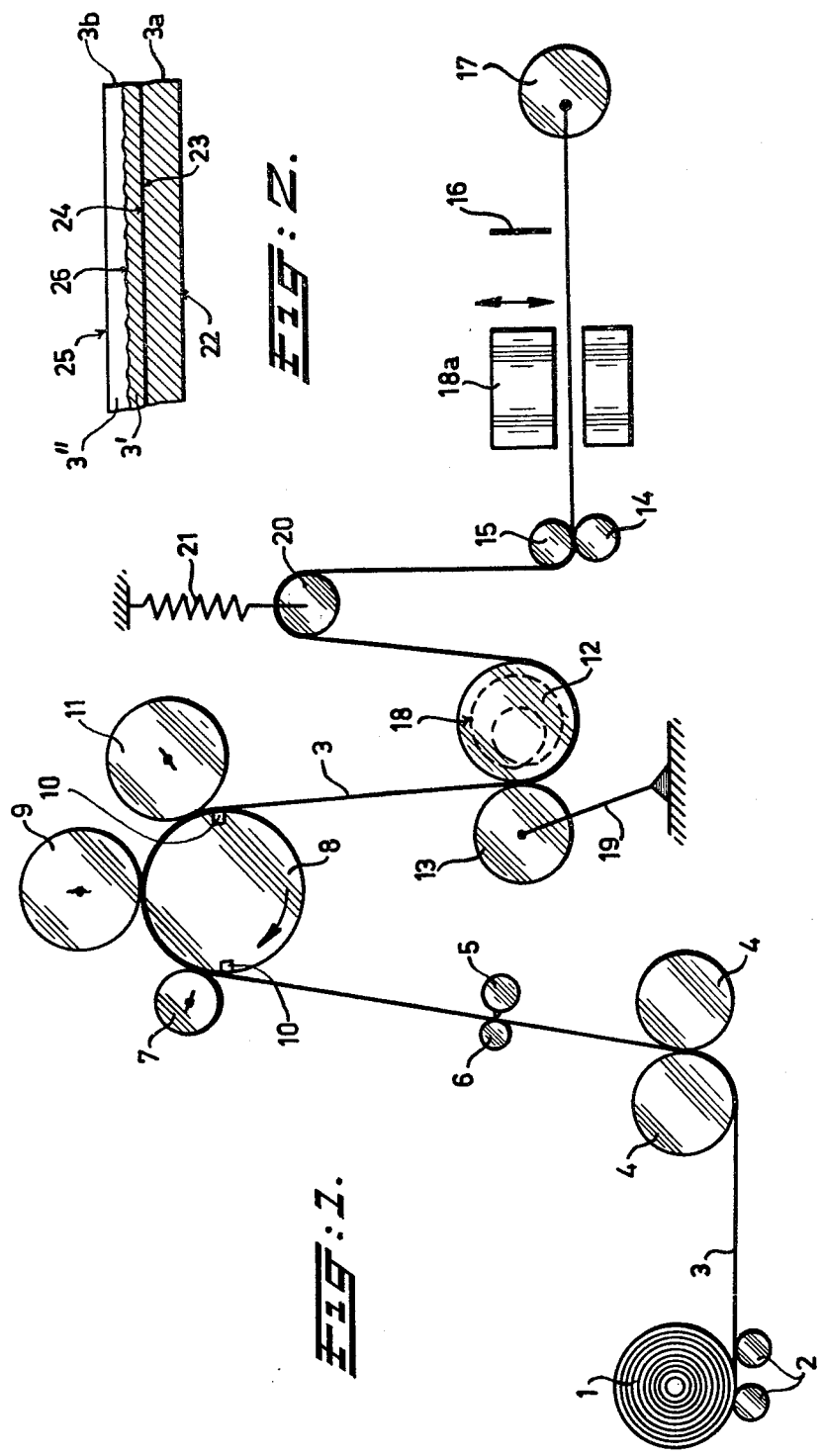

APPARATUS FOR MANUFACTURING PLASTIC BAGS IN A CONTINUOUS WAY

This application is a division of application Ser. No. 640,133, filed Dec. 12, 1975, now U.S. Pat. No. 4,030,956, which is a continuation in part of my prior application Ser. No. 337,493, filed March 2, 1973 now abandoned.

BACKGROUND OF THE INVENTION

This invention relates to a method for manufacturing plastic bags in a continuous way be operating a sealing member upon guided tubular foil of thermoplastic material, whereupon the bag formed is either separated from the foil band or perforations are made in the vicinity of a sealed joint for separating a bag.

Such a method is known per se. This method has, however, the drawback that owing to operation of the sealing member the plastic shrinks at the location of the sealed joint, which impairs the plastic foil and often will result in a sealed joint of poor quality.

It is evident that the strength of the bag decreases, as owing to shrinkage a weakening of the wall thickness is produced whereby the formation of cracks easily occurs when the bag is filled with material.

It has been attempted to obviate these difficulties by severing part of the tubular foil prior to formation of the sealed joint and to make the sealed joint at the free end of part of the tubular foil. This method has the advantage that the plastic can shrink along from both ends in the direction of the sealed joint whereby a weakening of the wall does not take place and the quality of the bag increases considerably.

This method for manufacturing bags has, however, the disadvantage that the bags cannot be put on the market as bands, comprising a row of bags, connected by means of perforations. At present such bands are preferred for delivering thin-walled plastic bags for packing household refuse.

SUMMARY OF THE INVENTION

The invention aims to provide a method in which this trouble is overcome and bands of bags are obtained comprising a row of bags interconnected by perforations, while the sealed joint is of excellent quality and its formation is achieved without unwanted local weakenings of the wall.

This aim is attained in that a method is provided of continuously manufacturing plastic bags from a length of thermoplastic tubular foil having two superposed walls, comprising the steps of:

(a) continuously moving the foil to bring the lower of the walls against a heating element, while the upper wall remains exposed, to heat the entire inner wall of said lower of the superposed walls but only a part of the thickness of the upper wall, starting from the one surface facing said lower wall to at least the plasticizing temperature of the plastics of the foil; the heating is done along longitudinally spaced-apart lines transverse to both the longitudinal direction of the foil and the direction of movement of the foil, I. without compressing the walls together against the heating element, and II. while maintaining the portion of the superposed walls being heated in an untensioned condition, and (b) thereafter moving the heated foil walls between a first and second pressure surface engaging each other to press the heated superposed walls together, the first pressure surface engaging the outer surface of said upper wall consisting of a good heat conducting material being maintained at a temperature below the softening temperature of the foil.

When such a sealing method is performed the sealed joint obtained appears to be superior to that obtained according to the known method. This is probably due to the fact that the plastic material is firstly plasticized without applying pressure at the location of the sealed joint, such that the entire thickness of the lower wall facing the sealing element is plasticized but only a part of the thickness of the upper wall lying upon the lower wall is plasticized, whereupon the whole is subjected to pressure while applying a cooling roller discharging the heat rapidly from the original outer surface of the upper wall which is just opposite the surface of said one wall contacting the heating element and whereas on the other hand required compression between consecutive foil layers is performed.

The metal surface of the roller contacting the outer surface of said upper wall under pressure is cooled with a cooling medium, for instance by blowing ambient air.

When operating the heated sealing member a tubular foil band can be passed one or more times along a roller spaced apart from the sealing member such that the spacing corresponds to the total layer thickness of the upper and lower foil layers.

In this manner adequate contact between the upper and lower foil layers is ensured which are excellently interconnected when they pass the first and second pressure rollers later on.

Transport speed of foil material from the operation area of a sealing member, as far as the operation area of the cooling rollers, is lower than supply speed of tubular foil being sealed.

After a welded joint has passed from between the first and second pressure rollers but prior to renewed operation of a sealing member upon foil material the same is drawn slippingly from the pressure rollers so as to neutralize speed transport differences of the foil band.

For improving the quality of the sealed joint it is advisable to provide the foil band, prior to sealing, with a perforation at a short distance from the sealed joint to be formed. This weakening perforation too, improves the quality of the sealed joint, as the material owing to this weak area which should serve as a tear-off spot later on, can shrink along in the direction of the sealed joint.

When performing a method of the aforementioned type the foil band should preferably be printed after sealing in such a manner that printing is done is the area between a sealed joint and a perforation situated at a great distance therefrom. Actually one usually firstly prints the foil band prior to formation of perforations and sealed joint. This is disadvantageous as sealing members which frequently contact printed material impair the operation of said sealing members. Moreover, printing can be performed better at a very particular distance from the sealed joint.

This invention also relates to device for manufacturing plastic bags by operating a heated sealing member upon a tubular foil, guided via a rotatable foil supporting drum for supporting the foil comprising supply rollers, discharge rollers and guide members for the tubular foil, as well as one or more heatable sealing members and separating means and/or perforation means, said device being distinguished in that the sealing member or members are thermally insulated with respect to the surface of the rotatable roller, and in that in the direction of advance of the foil band a first and second pressure roller engaging each other under pressure are disposed in spaced relationship from the rotatable drum, which can cooperate under pressure, whereas one of the presser rollers can be cooled.

Due to use of a thermally insulated sealing member with respect to the rotatable drum for supporting the foil during heating, it is insured that the surface temperature of the roller, consisting of conductive material, will not rise or at least be considerably below the plastification point of the plastic. This temperature amounts to less than 60° for polyethylene for example.

The presser roller contacting the outer surface of the upper wall of the tubular foil is a metal roller, the metal surface having a great diameter for discharging heat; consequently this metal roller almost never has temperatures exceeding the room- or ambient temperature.

One or more contact means or rollers are conveniently provided opposite the rotatable drum for supporting the foil during heating, clearance between drum and contact means or roller being adjusted substantially equal to the total consecutive layer thickness of the tubular foil band. These contact means or rollers consist advantageously of foam rubber. Instead of contact rollers it is also possible to use sweepers which can be mounted on a drum.

DESCRIPTION OF THE ACCOMPANYING DRAWINGS

The invention is hereinafter clarified with reference to the accompanying drawings in which FIG. 1 shows an embodiment of the invention represented in outline, FIG. 2 a schematic cross section of the two superposed walls of the tubular thermoplastic foil at the end of the heating stage.

DESCRIPTION OF PREFERRED EMBODIMENTS

This device comprises a rotatably supported reel 1 with tubular polyethylene foil 3. This reel bears on rotatable rubber rollers 2, which can be driven at a circumferential speed corresponding to the desired transport speed of the foil band.

Motor speed can be controlled by tubular foil 3, as soon as the same is past the driven guide rollers 4.

Past the guide rollers perforators 5 are arranged providing the tubular foil with a transverse perforation line so as to enable bags to be drawn from the flattened tubular foil later on. These perforators 5 consist of a rotatable perforation drum with projections and a stop roller 6 cooperating therewith.

After perforations have been performed the tubular foil band is guided over the rotatable foil supporting drum 8, having a metal surface carrying a sealing electrode 10. This sealing electrode 10 is thermally insulated with respect to the rotatable foil supporting drum 8. The sealing electrode 10 particularly consists of a metal, like copper, covered with teflon; the electrode can be heated up to a temperature ranging from 200° to 400° C by means of heating members (not shown) depending on the foil thickness, the driving velocity, and the type of foil. The foil band is pressed in a non-tensioned condition against the sealing electrode 10 by means of the guide rollers 4. During the heating the entire thickness of lower wall 3a between surfaces 22 and 23 of said wall 3a is heated to the plasticizing temperature of the thermoplastics, but of the upper wall 3b only the part 3' between surface 24 contacting the surface 23 and boundary surface 26 is also heated to this temperature but not the wall part 3" between boundary surface 26 and other surface 25 of the other wall 3b.

The surface of roller 8 beside sealing electrode 10 should have a temperature considerably below the one at which the plastic foil softens for example and preferably not over 30° C for polyethylene. After heating the tubular foil is guided away from sealing electrode 10 and passed from between cooling roller 12 being the first pressure surface and presser roller 13, being the second pressure surface cooperating therewith. It has been found that compression, after preceding plastification, considerably improves the quality of the sealed joint. Cooling roller 12 is internally provided with a cooling spiral 18 whereby the good heat conducting metal surface of cooling roller 12 can be kept continuously at room temperature or lower and heat of the seal is removed. It should be noted that the surface 25 and wall part 3" contacts the metal surface of roller 12.

In order to prevent during operation of sealing electrode 10, the upper foil layer from loosening itself from the one contacting the sealing member, two contact rollers 7 and 9 both consisting of foam rubber, are provided. The smallest distance between roller surface 8 and roller 7, 9, respectively is equal to the total thickness of walls 3a and 3b of the tubular foil. The contact rollers have, however, no compressing effect. It should be noted that sealing electrode 10 is mounted such in roller surface 8 that it is insulated by means of an asbestos insulation. For adjusting the exact position of rollers 7, 9, and 11 these rollers can be adjusted by means of slits in which the axis of the roller can be moved.

The surface of pressure roller 13 consists preferably of rubber but other materials may also be selected, like a metal surface covered with teflon. In some cases it is advisable to use the latter solution.

A lever 19 is disposed for pressing roller 13 against cooling roller 12.

The guide rollers 4 convey the tubular foil slightly faster than roller 13 and cooling roller 12, so that the tubular foil contacts sealing electrode 10 in a non-tensioned condition.

After the tubular foil has left sealing electrode 10 and before the latter contacts the tubular foil again, the tubular foil is slippingly drawn from between rollers 12 and 13 by means of a tension roller 20 cooperating with a spring 21. Thus formation of too large a curve between roller 8 and rollers 12, 13 is avoided. This result can be obtained by spacing roller 13 from roller 12.

Beyond cooling roller 12 and presser roller 13 cooperating rotatable rollers 14 and 15 are arranged which move the tubular foil at the same speed as the feed rollers 4.

From these rollers the tubular foil is passed through a printing machine 18a where printing is effected.

When printing, print is performed exactly between a sealed joint and a perforation. This is, however, not necessary as one may also print over the sealed joint and perforation. After leaving the printing device, the tubular foil is passed along a folding triangle 16, where the foil is doubled, whereupon the tubular foil is wound up on a winding device 17 until for instance 20 bags have been wound up in all. At that time the wound up part of the supplied foil band is torn off along the perforation. In order to obtain the best possible sealed joint, it is advisable to have the sealing drum 8 rotate slightly slower than the feed rollers 4. The foil can then be pressed on the sealing drum very conveniently whereby proper heating of the upper foil layer can be obtained. On the other hand it is advisable to drive the presser roller or the cooling roller itself, slightly slower than the sealing drum.

What I claim is:

1. An apparatus for manufacturing plastic bags from a length of thermoplastic tubular foil having two superposed walls, comprising:
    a rotatable drum for supporting the foil,
    a heating element carried by and exposed on the surface of said drum, said heating element being parallel to the axis of rotation of said drum,
    a pair of rotating feed rollers, spaced from said drum, for feeding the thermoplastic foil to the surface of said drum,
    means for maintaining one of the foil walls in engagement with said heating element and for maintaining the two foil walls in contact with each other,
    a pair of rotating pressure rollers, spaced from said drum, for moving the foil away from said drum and for pressing the heated superposed foil walls together, said pressure rollers rotating at a speed such that they move the foil at a speed slower than the foil is moved by said feed rollers, whereby the foil moves to the surface of said drum in an untensioned condition,
    said pressure rollers being movable away from each other to provide a gap between them through which the foil can be slipped, and
    means for drawing the foil through the gap between said pressure rollers when the latter are moved apart to take up the slack foil between said feed and pressure rollers which occurs due to the fact that said feed rollers move the film faster than said pressure rollers.

2. An apparatus as defined in claim 1 wherein said means for maintaining the two foil walls in contact include a roller having a resilient surface spaced from said drum surface a distance equal to no less than the total thickness of the two foil walls.

3. An apparatus as defined in claim 1 wherein said foil-drawing means includes a support surface over which the foil passes, and resilient means for urging said support surface in a direction which applies longitudinal tension to the foil.

4. An apparatus as defined in claim 3 wherein said support surface is located to receive the foil after it passes between said pressure rollers.

5. An apparatus as defined in claim 1 wherein said foil-drawing means includes a roller around which the foil passes after it moves between said pressure rollers, and spring means constantly urging said foil-drawing roller in a direction which applies longitudinal tension to the foil.

6. An apparatus as defined in claim 1 including means for cooling the one of said pressure rollers which contacts the foil wall which engages said heating element so as to maintain the temperature of said one pressure roller below the softening temperature of the foil.

7. An apparatus as defined in claim 6 wherein said cooling means maintains the temperature of said first pressure surface not higher than 50° C.

8. An apparatus as defined in claim 6 wherein said cooling means maintains the temperature of said first pressure surface not higher than ambient temperature.

* * * * *